United States Patent [19]

Marco et al.

[11] Patent Number: 5,565,507
[45] Date of Patent: Oct. 15, 1996

[54] ADHESIVE COMPOSITION

[75] Inventors: Francis W. Marco, Pauline, S.C.; Dany F. M. Michiels, Haaltert, Belgium

[73] Assignee: Milliken Research Corporation, Spartanburg, S.C.

[21] Appl. No.: 267,781

[22] Filed: Jun. 28, 1994

[51] Int. Cl.$^6$ .............................. C08K 3/20; C08L 63/02
[52] U.S. Cl. .......................... 523/413; 523/407; 523/411; 524/526; 524/915
[58] Field of Search .................................. 523/407, 411, 523/413; 524/501, 516, 915, 526

[56] References Cited

U.S. PATENT DOCUMENTS

| | | | |
|---|---|---|---|
| 3,419,450 | 12/1968 | Krysiak et al. | |
| 4,012,350 | 3/1977 | Burke, Jr. et al. | 260/29.3 |
| 4,195,008 | 3/1980 | Gruber | 260/29.7 |
| 4,259,404 | 3/1981 | Van Gils | |
| 4,405,746 | 9/1983 | Girgis | 524/501 |
| 4,456,727 | 1/1984 | Middlebrook | 524/511 |
| 4,963,613 | 10/1990 | Toyoda et al. | 524/594 |
| 5,030,692 | 7/1991 | Durairaj | 525/132 |
| 5,236,742 | 8/1993 | Sekiguchi et al. | 427/389.7 |
| 5,286,783 | 2/1994 | Hisaki et al. | 524/510 |
| 5,298,539 | 3/1994 | Singh et al. | 524/92 |
| 5,306,369 | 4/1994 | Fujiwara et al. | 156/110.1 |

FOREIGN PATENT DOCUMENTS

| | | |
|---|---|---|
| 0235988 | 9/1987 | European Pat. Off. . |
| 49-133431 | 12/1974 | Japan . |

*Primary Examiner*—Melvyn I. Marquis
*Assistant Examiner*—D. Aylward
*Attorney, Agent, or Firm*—Terry T. Moyer; Timothy J. Monahon

[57] ABSTRACT

An aqueous adhesive composition for bonding reinforcing textiles to rubber products is provided, having an epoxy resin with a functionality of three or greater and a rubber latex functionalized with pendent groups selected from carboxyl, amide and pyridyl groups.

9 Claims, 1 Drawing Sheet

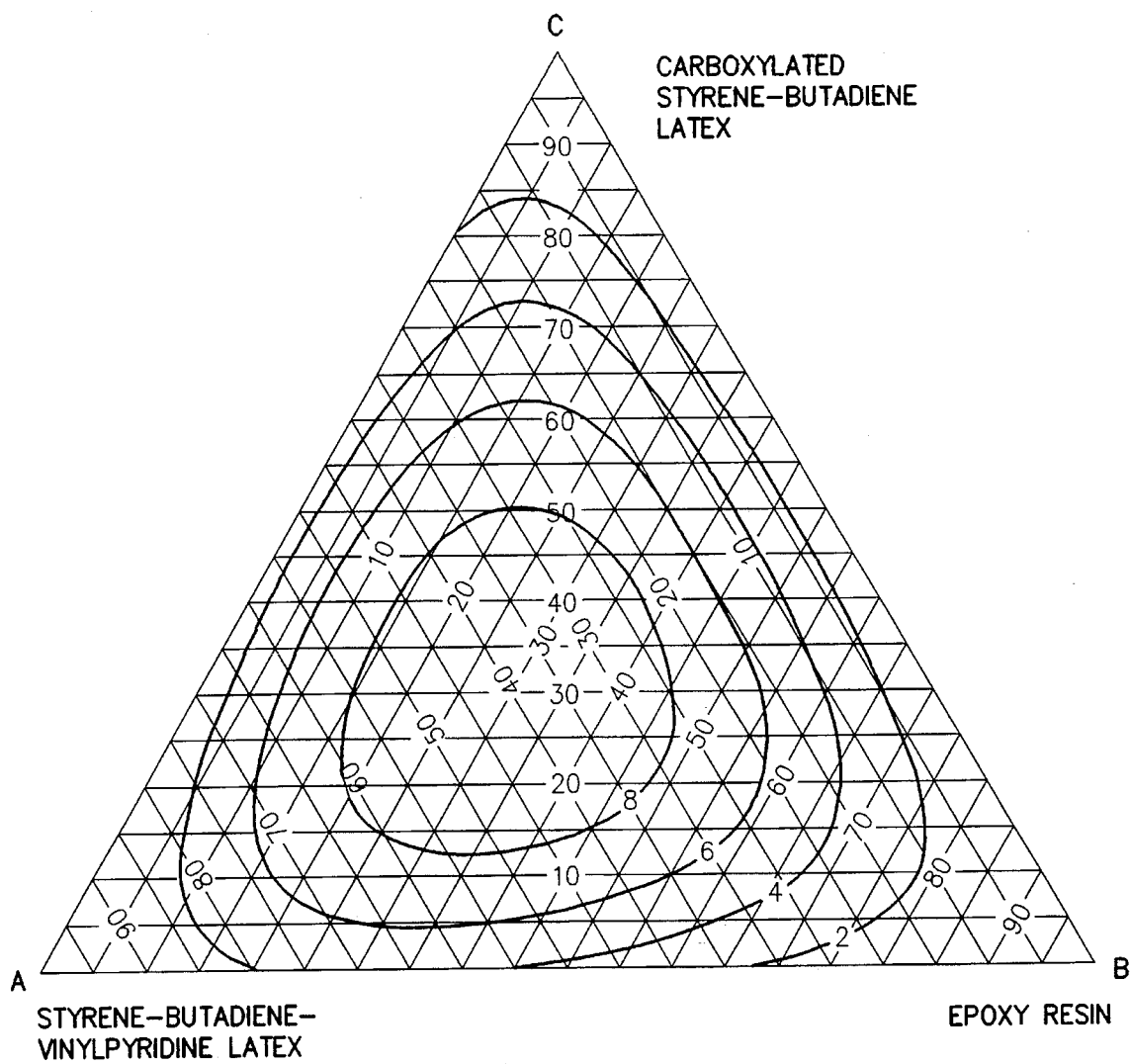
FIG. -1-

ADHESIVE COMPOSITION

BACKGROUND OF THE INVENTION

The present invention relates generally to an aqueous adhesive composition for bonding reinforcing textile yarns and fabrics to rubber products, which contains an epoxy resin having an epoxy functionality of three or greater.

Textiles are used extensively to reinforce rubber products such as tires, v-belts, and conveyor belts. The textile may be in the form of a fiber, yarn, or a woven, knitted or non-woven fabric. Fibers typically used for reinforcement are manufactured from polyamides, including nylons and aramids, polyesters, particularly polyethylene terephthalate, rayon and glass fibers.

One of the difficulties encountered in manufacturing reinforced rubber products is that the textile fibers do not adhere well to the rubber without additional chemical treatment. A number of systems have been developed to promote adhesion of the fiber to the rubber. One such system is based on pretreatment of the textile fibers with an adhesive to promote bonding. The textile is dipped in the adhesive composition, which is usually an aqueous latex, followed by drying and curing.

The most common pretreatment system is based on an adhesive containing resorcinol-formaldehyde latex (RFL), usually in combination with a functionalized butadiene or styrene butadiene latex. Examples of functionalized latices include copolymers of conjugated dienes with vinylpyridine, unsaturated carboxylic acids, and cyanated vinyl monomers. Representative adhesive compositions may be found in the following United States patents:

Girgis, U.S. Pat. No. 4,405,746;
Toyoda et al., U.S. Pat. No. 4,963,613;
Sekigushi et al., U.S. Pat. No. 5,236,742; and
Hisaki et al., U.S. Pat. No. 4,286,783.

Some textile fibers, especially aramid and polyester fibers, require a two-step treatment to ensure good adhesion of the textile and rubber product. For example, the textile product may be first treated with a polyisocyanate, polyepoxide, polyamine, or ethylene urea followed by treatment with the RFL-functionalized diene latex formula. Of course, the two-step or double-dip treatment increases the process steps and is undesirable from an economic point of view.

Another system used to promote the adhesion of reinforcing textiles to rubber products is to incorporate additives into the rubber itself. Thus, in Durairaj, U.S. Pat. No. 5,030,692 a resorcinol-formaldehyde resin is compounded in the rubber to improve the mechanical properties of the rubber and promote tire cord to rubber adhesion.

One of the drawbacks of systems incorporating resorcinol-formaldehyde resins, whether used to pretreat the textile or for incorporation into the rubber itself, is the relative toxicity of resorcinol and formaldehyde and their undesirability in the workplace. Another shortcoming of the use of resorcinol-formaldehyde latex pretreatments is that the RFL adhesives must be aged before use and have a limited shelf life.

In Singh et al., U.S. Pat. No. 5,298,539, a vulcanizable rubber composition is provided having a derivative of melamine, acetoguanamine, etc. incorporated therein. The rubber composition has improved toughness and adhesion to tire cord. Nevertheless, it is desirable to provide an adhesive composition which does not require compounding additives into the rubber product itself.

All of the aforementioned patents are incorporated by reference herein.

SUMMARY OF THE INVENTION

Therefore, one object of the invention is to provide an adhesive composition for bonding a textile to a rubber product. Another object of the invention is to provide an adhesive composition which is applied to the textile as a pre-treatment in a single step. Another object of the invention is to provide an adhesive composition which is free of resorcinol-formaldehyde resin. Yet another object of the invention is to provide an adhesive composition in the form of a stable aqueous dispersion.

Accordingly, an aqueous adhesive composition is provided having a dispersion of a trifunctional or greater epoxy resin and a functionalized rubber latex containing carboxyl, amide or pyridyl functionalities, or derivatives thereof. In one embodiment, the aqueous adhesive composition is a mixture of (a) a trifunctional or greater epoxy resin; (b) a conjugated diene/vinylpyridine or conjugated diene/styrene/vinylpyridine latex; and (c) a conjugated diene/ethylenically unsaturated carboxylic acid or diene/styrene/ethylenically unsaturated carboxylic acid latex. Also included within the scope of the invention is a process for using the adhesive composition to pretreat a textile to promote bonding to a rubber product, and a product made thereby.

The invention has the advantages of eliminating the two-step process required to adhere rubber to difficult to bond to textiles such as aramids and polyesters. Further advantages include elimination of resorcinol-formaldehyde resin, elimination of requirements that the adhesive be aged before use (ripening), and extension of the shelf life stability of the adhesive. The invention features an economical and dependable adhesive composition with excellent bonding properties.

BRIEF DESCRIPTION OF THE DRAWINGS

FIG. 1 is a triangular graph of contours of constant cold tear at various concentrations of a three-component adhesive composition containing an epoxy resin, carboxylated styrene-butadiene rubber latex and a styrene-butadiene-vinylpyridine copolymer latex.

DETAILED DESCRIPTION OF THE INVENTION

Without limiting the scope of the invention, the preferred features and embodiments of the invention are hereinafter set forth. Unless otherwise indicated, all parts, percentages and ratios are by weight. The term "copolymer" is intended to include polymers containing two, three or more types of monomer units.

The adhesive composition of the present invention is an aqueous dispersion of an epoxy resin and a functionalized rubber latex. The epoxy resin has an epoxy functionality of three or greater. A large number of commercially available epoxy resins are available and by way of example and not limitation, include epoxy cresol-novolak resins; epoxy phenol-novolak resins; poly nuclear phenol-glycidyl ether-derived resins, such as the tetraglycidyl ether of tetrakis(4-hydroxyphenyl) ethane; resins containing an aromatic amine backbone, such as triglycidyl p-aminophenol-derived resins and triglycidyl triazine-derived resins such as triglycidyl isocyanurate. Preferably, the epoxy resin is a cresol-novolak or phenol-novolak resin.

To enhance the stability of the dispersion, it is desirable to select epoxy resins having an average particle size of less than 5 microns, preferably less than 3 microns, and most preferably about 1 micron or less. Typically, the molecular weight of the cresol-novolak and phenol-novolak epoxy resins range from about 475 to 1750, with 650 to 1500 being preferred. Also included within the scope of the invention are trifunctional epoxy resins which have been modified to enhance their dispersability such as by grafting acrylic monomers to the epoxy resin backbone.

The functionalized rubber latex may be generally characterized as a rubber latex having pendant carboxyl, amide, or pyridyl functionalities, and such functionalities are intended to include derivatives thereof, such as are further described and exemplified hereafter. Also included within the scope of the invention are rubber latices which contain combinations of one or more of these functionalities. The functionalized rubber latices are typically produced by copolymerization of a conjugated diene, and ethylenically unsaturated monomer containing one of the aforementioned functionalities, and optionally, compatible monomers, such as those used in elastomer copolymers.

Suitable dienes include conjugated dienes having from 4 to 9 carbon atoms such as 1,3-butadiene, 2-methyl-1,3-butadiene, 2-ethyl-1,3-butadiene, 2,3-dimethyl-1,3-butadiene and halogen-substituted butadienes, such as 2-chloro-1,3-butadiene.

As is well known in the art, compatible comonomers may also be included for copolymerization in the rubber latices. For example, aromatic vinyl compounds, such as styrene, α-methylstyrene, 2-methylstyrene, 3-methylstyrene, 4-methylstyrene, 2,4-di-isopropylstyrene, 2,4-dimethylstyrene, 4-t-butylstyrene, 5-t-butyl-2-methylstyrene, monochlorostyrene, dichlorostyrene, monofluorostyrene and hydroxymethylstyrene may be employed. Another class of compatible monomers include cyanated vinyl monomers such as acrylonitrile, methacrylonitrile, fumaronitrile, and maleonitrile. Still another class of compatible monomers include aliphatic vinyl compounds, such as ethylene, propylene, and vinyl chloride. The amount of the compatible monomer in the rubber latex is generally 55% by weight or less.

Monomers which may be polymerized into the rubber latex to provide a carboxyl functionality may include ethylenically unsaturated carboxylic acids, such as acrylic acid, methacrylic acid, crotonic acid, cinnamic acid, itaconic acid, fumaric acid, maleic acid and butene tricarboxylic acid; monoalkyl esters of ethylenically unsaturated dicarboxylic acids; and ethylenically unsaturated acid anhydrides, which may be hydrolyzed to the corresponding carboxylic acid.

The carboxyl functionalized monomer is typically provided in the functionalized rubber latex in a range of 0.1 to 25 wt %, preferably 0.5 to 12 wt %, most preferably 1 to 7 wt %. These compounds, generally referred to as carboxylated rubber latices, are well known and commercially available, such as Tylac NP-1672®, available from Reichold Chemical Company as a 70% solid carboxylated styrene/butadiene polymer dispersion in water.

Suitable functionalized monomers for providing a pyridyl functionality include vinylpyridines, such as 2-vinylpyridine, 3-vinylpyridine and 4-vinylpyridine as well as alkyl derivatives thereof such as 2-methyl-5-vinylpyridine and 5-ethyl-2-vinylpyridine, 2-methyl-6-vinylpyridine and 2-ethyl-4-vinylpyridine.

The pyridyl functionalized monomer is generally provided in the functionalized rubber latex in the amount of 5 to 45 wt %, preferably 10 to 30 wt %. Vinylpyridine/rubber latex copolymers are commercially available, such as Pliocord LVP-4668™ from Goodyear Chemical Company which is a 40% solids dispersion in water of styrene/butadiene/vinylpyridine in the approximate weight ratio of 45:45:10.

Another class of functionalized monomers include ethylenically unsaturated compounds having a pendant amide or amide derivative group. Useful monomers include acrylamide and N-methylolacrylamide. These compounds may be employed in free radical, emulsion polymerization with the conjugated diene monomers and optional compatible monomers, such as disclosed in Kirk-Othmer Encyclopedia of Chemical Technology, 3rd Edition, Volume 14, page 82 on "Latex Technology". The amide functionalized monomer may be employed effectively in amounts of from 0.1 to 30 wt % in the functionalized rubber latex.

Also within the scope of the present invention are adhesive compositions containing functionalized rubber latices having both pendant carboxyl and pyridyl groups, or derivatives thereof. For example, Hisaki et al., U.S. Pat. No. 5,286,783, discloses a copolymer latex obtained by emulsion polymerization of from 45 to 85% of a conjugated diene monomer, 0.1 to 25% of an ethylenically unsaturated acid monomer, 10 to 45% of a vinylpyridine monomer and up to 30% other comonomers, such as aromatic vinyl compounds.

The relative concentration of the epoxy resin and functionalized rubber latex in the adhesive composition may range from 1:15 to 4:1, preferably 1:4 to 1:1. In an alternate embodiment, the adhesive composition contains an epoxy resin and both a carboxylated rubber latex and a pyridyl functionalized rubber latex. Optimum adhesion between a reinforcing textile and rubber product may be achieved when the adhesive composition contains the following relative concentration of components: from 7–60 wt % epoxy resin, from 5–65 wt % carboxylated rubber latex, and from 15–75 wt % pyridyl functionalized rubber latex; preferably, from 15–50 wt % epoxy resin, from 10–50 wt % carboxylated rubber latex, and from 20–65 wt % pyridyl functionalized rubber latex; most preferably, from 25–40 wt % epoxy resin, from 15–30 wt % carboxylated rubber latex, and from 35–55 wt % pyridyl functionalized rubber latex.

The adhesive composition is aqueous with a solids content of from 2 to 60, preferably 7 to 30 wt %. In addition to the epoxy resin and functionalized rubber latex or latices, the adhesive composition may contain dispersants, surfactants, tackifiers, isocyanates, and antifoaming agents, as is well known in the art. The aqueous portion of the adhesive composition may also contain minor amounts of hydrophilic solvents, such as methanol, without deviating from the scope of the invention.

The reinforcing textile may be in the form of a fiber, spun or continuous filament yarn, or a woven, knitted or nonwoven fabric. Fibers having a denier of 0.1 to 10; yarns having a denier of 15 to 4,000; and fabric weighing 1 to 30 oz/yd$^2$ may be employed, although textiles outside these ranges may find utility for specialty laminates. The textile may be constructed of any number of natural or synthetic fibers or blends thereof. Preferably, the textile material is selected from polyamide, including nylon and aramid, polyester, including polyethylene terephthalate, polyolefin, rayon, and glass fibers.

The aqueous adhesive composition is applied to the textile to give an add-on of from 1 to 30 wt % solids based on a weight of the untreated textile, preferably 5 to 15 wt % solids. Any of a number of techniques, as are well known in the art, can be employed, such as dipping, spraying, or application from a kiss roll. In one embodiment, a woven fabric is dip-coated by immersion in the aqueous adhesive composition at ambient conditions.

Following application of the adhesive composition, the textile is dried to remove water and any other volatile solvents present. For example, one drying procedure is performed in a tenter frame at 350° F. for two minutes. Curing of the adhesive on the textile is typically achieved by heating in the tenter frame at 350° F. for an additional two minutes, although the adhesive may be cured at lower temperatures.

The textile, after having been pretreated with the adhesive composition as described above, is ready for lamination to a rubber product. The textile may be laminated to one side of a rubber product or incorporated within, such as by sandwiching the textile between two pieces of rubber. By way of example, suitable rubber products include those made from natural rubber, neoprene, polybutadiene, polyisoprene, epichlorohydrin, styrene-butadiene, butyl, nitrile, ethylene-propene copolymer (EPM or EPDM), fluoroelastomer, polyacrylate, and chloro-substituted polyethylene rubber. The rubber products may be a blend of any of the aforementioned rubbers, and may contain additives and processing aids as are known in the art.

Generally, the pretreated textile is laminated to the rubber product, while the rubber is in an uncured state by heating the laminate under pressure to cure the rubber and bond the textile to the rubber product, for example, by vulcanization, as is well known in the art practiced with resorcinol-formaldehyde treated textile reinforcement.

The invention may be further understood by reference to the following examples, but the invention is not to be construed as being unduly limited thereby.

The following examples, Example 1 and Example 2, compare the adhesive strength of compositions containing a trifunctional epoxy resin and a difunctional epoxy resin, respectively.

EXAMPLE 1

An aqueous adhesive composition was prepared containing 2.5 weight percent of a trifunctional epoxy resin (EPIREZ™ W-55-5003, available as a 50 weight percent solids emulsion, Shell Chemical Company) and 10 weight percent of a heat reactive, carboxylated terpolymer latex of butadiene, styrene and acrylonitrile (HYCAR™ 1578X1, available as a 50 weight percent solids emulsion, B. F. Goodrich Chemical Company).

The adhesive composition was padded on a 100% polyester woven fabric to provide a wet pick-up of approximately 60 weight percent based on the weight of the fabric. The fabric was constructed of 52 ends per inch of 1,680 total denier (840/2) multifilament polyester yarn and 22.5 picks per inch of 1,300 total denier (1300/1) multifilament polyester yarn having a 1×1 plain weave and an uncoated weight of 17 ounces per square yard. After application of the adhesive composition, the fabric was cured in an oven at 350° F. for 3 minutes. Next, an uncured, compounded nitrile rubber, having a thickness of 40 mils, was sandwiched between a pair of treated fabric strips and heated in an hydraulic press at 300 pounds per square inch at a temperature of 298° F. for 30 minutes.

The adhesive strength between the fabric and rubber was tested on a one inch composite strip according to ASTM D-2630 and found to be 46.0 pounds.

EXAMPLE 2

The procedure of Example 1 was repeated in all respects, except that the trifunctional epoxy resin was replaced with an equal weight of a difunctional epoxy resin (EPIREZ™ WD510, available as a 100 percent solids water dispersable resin, Shell Chemical Company), to provide 2.5 weight percent epoxy resin in the composition.

A one inch composite strip was tested according to ASTM D-2630 as above, and the adhesion strength was found to be 27.8 pounds.

EXAMPLE 3

The following example demonstrates a preferred embodiment of the adhesive composition.

A series of aqueous adhesive compositions was prepared containing varying amounts of epoxy resin, carboxylated styrene-butadiene rubber and pyridyl functionalized styrene-butadiene rubber. All of the adhesive compositions were adjusted to 30 wt % solids.

TABLE 1

| Composition | Epoxy Resin[1] | Carboxylated Rubber Latex[2] | Pyridyl Functionalized Rubber Latex[3] |
|---|---|---|---|
| 1 | 10 | 10 | 10 |
| 2 | 10 | 0 | 20 |
| 3 | 20 | 0 | 10 |
| 4 | 0 | 10 | 20 |
| 5 | 0 | 20 | 10 |
| 6 | 0 | 30 | 0 |
| 7 | 10 | 20 | 0 |
| 8 | 0 | 0 | 30 |
| 9 | 20 | 10 | 0 |
| 10 | 30 | 0 | 0 |
| 11 | 10 | 20 | 0 |
| 12 | 0 | 10 | 20 |
| 13 | 0 | 20 | 10 |
| 14 | 0 | 30 | 0 |
| 15 | 0 | 0 | 30 |
| 16 | 10 | 10 | 10 |
| 17 | 30 | 0 | 0 |
| 18 | 10 | 0 | 20 |
| 19 | 20 | 0 | 10 |
| 20 | 20 | 10 | 0 |

[1]Epirez W55-5003, Shell Chemical Company - Aqueous Dispersion of a Polyfunctional Aromatic Epoxy Resin with an Epoxy Equivalent Weight of 203.
[2]Tylac NP-1672, Reichold Chemical Company - Aqueous Dispersion of a Carboxylated Styrene-Butadiene Polymer; and
[3]Pliocord LVP-4668, Goodyear Chemical Company - Aqueous Dispersion of a Styrene-Butadiene-Vinylpyridine Terpolymer (45:45:10).

The textile material was a woven fabric of 210 denier nylon 6,6 with 89 ends by 58 picks per inch and a weight of 3.96 ounces per square yard. The fabric was pretreated by immersion in the aqueous adhesive composition followed by curing in an oven for four minutes at 375° F. The adhesive composition add-on was approximately 15 wt % solids based on the weight of the untreated fabric.

Next, an uncured, compounded rubber stock having a thickness of 20 mils, was sandwiched between a pair of treated fabric strips and heated in an hydraulic press at 300 pounds per square inch, at a temperature of 298° F. for 30 minutes. The rubber was a commercially available, compounded styrene-butadiene rubber. Five (5) fabric/rubber/fabric composites were prepared for each of the twenty compositions.

After curing, the laminates are cut into one inch wide strips of approximately 6 inches in length. The strength of the adhesive composition is tested on a Sinetech 10-D, which pulls the fabric strips of the laminate in opposite directions. The force to pull the fabric strips apart is measured and recorded. Additionally, the percent of rubber tear versus fabric-to-rubber delamination is evaluated. A higher percentage of rubber tear is indicative of adhesion strength, since rubber tear is due to failure of the cohesive force of the rubber stock, rather than the fabric-to-rubber stock bond. Each of the tests was given a score of one to ten, with "one" representing no rubber tear and "ten" representing 100% rubber tear, or in other words, the strongest fabric to rubber adhesion.

Based on the average results of testing Compositions 1–20, the contour graph in FIG. 1 was prepared.

There are, of course, many alternate embodiments and modifications of the invention, which are intended to be included within the scope of the following claims.

What we claim is:

1. An adhesive composition comprising an aqueous dispersion with a solids content of from 2 to 60 wt %, wherein said solids comprise from 7 to 60 wt % of an epoxy resin having at least three epoxy groups per molecule, from 5 to 65 wt % of a carboxylated rubber latex having from 0.1 to 25 wt % carboxyl functionalized monomers incorporated therein, and from 15 to 75 wt % of a pyridyl functionalized rubber latex having from 5 to 45 wt % pyridyl functionalized monomers incorporated therein.

2. The adhesive composition of claim 1 wherein said epoxy resin is selected from the group consisting of the polyglycidyl ethers of phenol-novolak and cresol-novolak resins.

3. The adhesive composition of claim 2 wherein said carboxylated rubber latex and said pyridyl functionalized rubber latex are styrene-butadiene latices.

4. The adhesive composition of claim 2 wherein said solids comprise from 15 to 50 wt % of said epoxy resin, from 10 to 50 wt % of said carboxylated rubber latex and from 20 to 65 wt % of said pyridyl functionalized rubber latex.

5. The adhesive composition of claim 4 wherein said carboxylated rubber latex and said pyridyl functionalized rubber latex are styrene-butadiene latices.

6. The adhesive composition of claim 2 wherein said epoxy resin has an average particle size of less than 5 microns.

7. The adhesive composition of claim 1 wherein said composition is free of resorcinol-formaldehyde resin.

8. The adhesive composition of claim 4 wherein said adhesive composition has a solid content of from 7 to 30 wt %.

9. The adhesive composition of claim 8 wherein said composition is free of resorcinol-formaldehyde resin.

* * * * *